US009844179B1

(12) United States Patent
Goering et al.

(10) Patent No.: US 9,844,179 B1
(45) Date of Patent: Dec. 19, 2017

(54) SYSTEM AND METHOD FOR ACCESSING A POWERTRAIN OF AN AGRICULTURAL VEHICLE

(71) Applicant: Deere & Company, Moline, IL (US)

(72) Inventors: Kevin J. Goering, Cambridge, IA (US); Michael J. Myers, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 2 days.

(21) Appl. No.: 15/183,331

(22) Filed: Jun. 15, 2016

(51) Int. Cl.
| | |
|---|---|
| *A01D 41/127* | (2006.01) |
| *A01D 41/00* | (2006.01) |
| *A01D 41/12* | (2006.01) |
| *A01D 46/12* | (2006.01) |
| *A01D 46/16* | (2006.01) |
| *A01D 41/02* | (2006.01) |
| *A01D 46/08* | (2006.01) |

(52) U.S. Cl.
CPC ......... *A01D 41/1261* (2013.01); *A01D 41/02* (2013.01); *A01D 46/084* (2013.01); *A01D 46/12* (2013.01); *A01D 46/16* (2013.01)

(58) Field of Classification Search
CPC .... A01D 41/00; A01D 41/1261; A01D 41/02; A01D 46/084; A01D 46/08; A01D 46/12; A01D 46/16; A01D 67/00; A01D 41/1271; A01D 61/02; A01D 69/02; A01F 15/07; B62D 21/186
USPC ............. 56/13.1, 28, 16.4 B, 341, 432, 10.1; 100/88, 82, 151, 7, 138, 40, 152; 180/219, 291, 900; 460/115, 119
See application file for complete search history.

(56) References Cited

U.S. PATENT DOCUMENTS

| | | | | |
|---|---|---|---|---|
| 6,263,650 | B1* | 7/2001 | Deutsch ............... | A01D 46/082 56/16.4 B |
| 6,421,996 | B1* | 7/2002 | Deutsch ............... | A01D 46/084 100/88 |
| 6,941,740 | B2* | 9/2005 | Fox .......................... | A01F 15/07 100/88 |
| 9,474,206 | B2* | 10/2016 | Garton .................... | A01D 41/00 |
| 9,681,605 | B2* | 6/2017 | Noonan ................ | A01D 46/082 |

OTHER PUBLICATIONS

John Deere, "7760 Cotton Picker," operating manual (2010) 4 pages, section 35, Positioning Machine for Transport and Positioning Machine for Harvest, http://manuals.deere.com/omview/OMN401512_19/?tM.

* cited by examiner

*Primary Examiner* — Robert Pezzuto
(74) *Attorney, Agent, or Firm* — Michael Best & Friedrich LLP (57) ABSTRACT

An agricultural vehicle for picking or harvesting a product includes a motor, a plurality of tires, a transmission mating the motor to the plurality of tires, an accumulator operable to store the product, a module builder operable to receive the product from the accumulator, and a frame supporting the accumulator and the module builder. The frame defines a hatch through which an operator is capable of accessing the motor and/or the transmission. The agricultural vehicle is operable to transition between a first state and a second state. In the first state, the module builder and the accumulator prohibit access through the hatch. In the second state, the module builder and the accumulator are rotated relative to the frame and provide access through the hatch.

22 Claims, 7 Drawing Sheets

SYSTEM AND METHOD FOR ACCESSING A POWERTRAIN OF AN AGRICULTURAL VEHICLE

BACKGROUND

The present disclosure relates to agricultural equipment, and more particularly to a system and method for accessing an engine or transmission of an agricultural vehicle.

Agricultural equipment includes powered machinery capable of transporting, cultivating, planting, fertilizing, irrigating, sorting, harvesting, and other operations in the agricultural industry. Some equipment is driven (e.g., towed) by field vehicles such as tractors, such as planters and seeders. Other agriculture equipment includes a motor, transmission, and operator cabin such that the equipment is self-driven (i.e., does not require a tractor for towing), such as cotton harvesters and combine harvesters.

SUMMARY

An agricultural vehicle for picking or harvesting a product includes a motor, a plurality of tires, a transmission mating the motor to the plurality of tires, an accumulator operable to store the product, a module builder operable to receive the product from the accumulator, and a frame supporting the accumulator and the module builder. The frame defines a hatch through which an operator is capable of accessing the motor and/or the transmission. The agricultural vehicle is operable to transition between a first state and a second state. In the first state, the module builder and the accumulator prohibit access through the hatch. In the second state, the module builder and the accumulator are rotated relative to the frame and provide access through the hatch.

A method of accessing a powertrain of an agricultural vehicle in a first state in which a module builder receives a product from an accumulator, the accumulator is attached to a frame of the agricultural vehicle and at least partially covers a hatch defined by the frame, and the hatch provides access to the powertrain of the vehicle. The method includes detaching the accumulator from the frame, attaching the accumulator to the module builder, and rotating the module builder and the accumulator, thereby providing access to the hatch.

An agricultural vehicle for picking or harvesting a product includes a frame supporting a motor and including a first attachment point, an accumulator, and a module builder attached to the frame and operable to rotate about a pivot point. The module builder includes a second attachment point. The accumulator is operable to transition between a first state and a second state. In the first state, the accumulator is attached to the first attachment point. In the second state, the accumulator is attached to the second attachment point and is operable to rotate about the pivot point.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
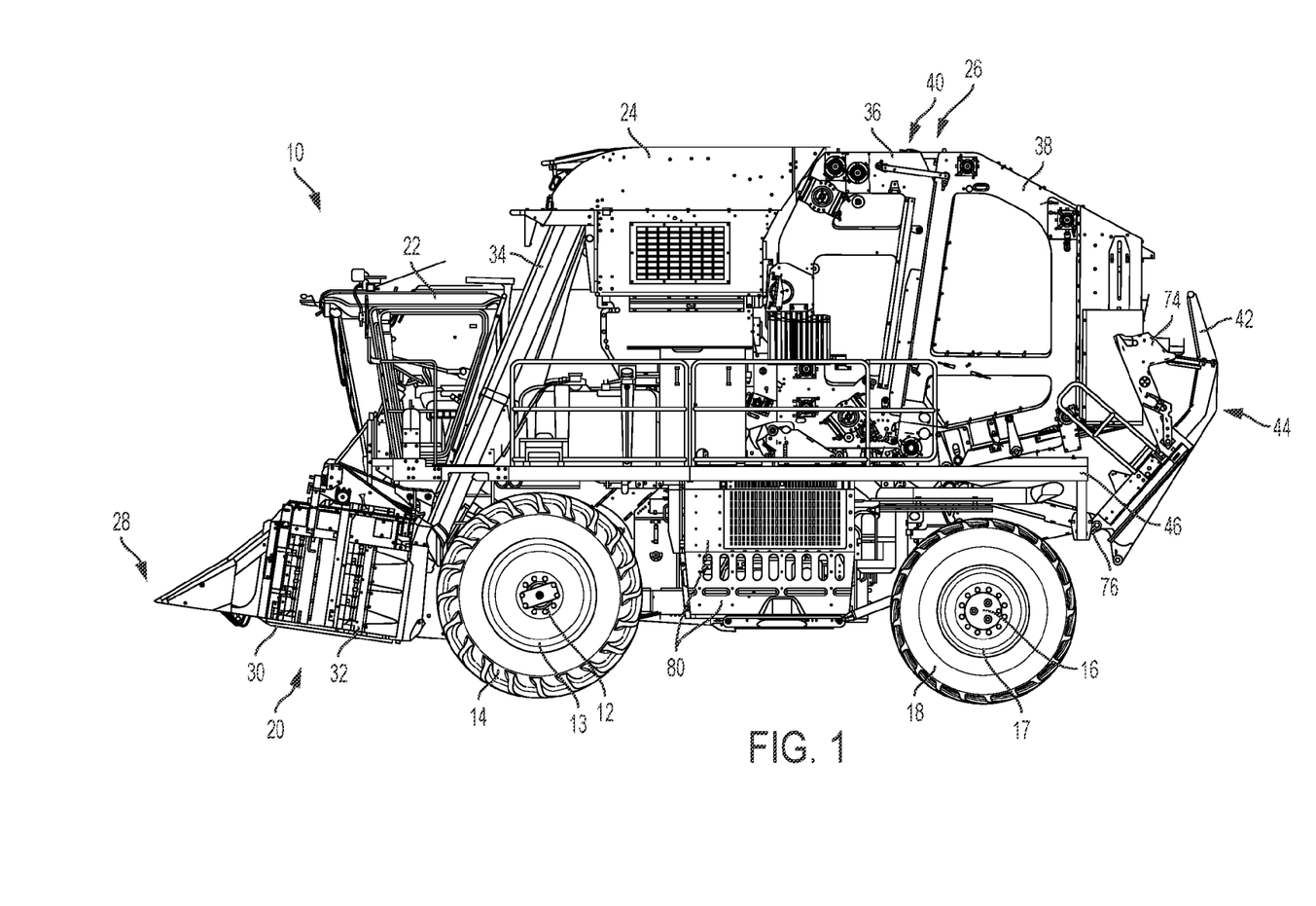
FIG. 1 is a side view of a cotton harvester in a harvest state.

As shown in FIG. 1, an agricultural vehicle 10 (e.g., a cotton harvester 10) includes a pair of axles, a front axle 12 supporting a pair of front wheels 13 and front tires 14, and a rear axle 16, supporting a pair of rear wheels 17 and rear tires 18. The tires 14, 18 support the harvester 10 and provide a rolling surface for the same. An engine and transmission (shown with reference numerals 160, 162, respectively, with reference to harvester 110 in FIG. 3) transmit power to the front axle 12, wheels 13, and tires 14 to provide motive power for the harvester 10. The cotton harvester 10 further includes inline row units 20, an operator cabin 22, a feeder or accumulator 24, and a module builder 26 supported by a frame 46.

The inline row units 20 are located at a front end 28 of the harvester 10 (as shown to the left of FIG. 1) and include a plurality of picker heads 30 and spindle assemblies 32 spaced apart from one another (e.g., 30-40 inches apart; extending into the page, as shown in FIG. 1) for picking cotton and directing it toward the accumulator 24 through chutes 34 associated with each spindle assembly 32. The cotton gathers within the accumulator 24 until an infeed belt driven by a hydraulic motor (not shown) carries the cotton into the module builder 26, specifically a processing system 40 of the module builder. When a predetermined amount of cotton is located within the module builder 26, a wrap is fed around the cotton within the module builder 26 to surround the cotton and produce a module. The module is moved from the processing system 40 to an outboard state, resting upon a module handler or module handling system 42, and from the module handling system is placed on the field. As shown, the module builder 26 is a round module builder, operable to produce round modules (i.e., generally cylindrical modules with a round cross-section).

Figure 2:
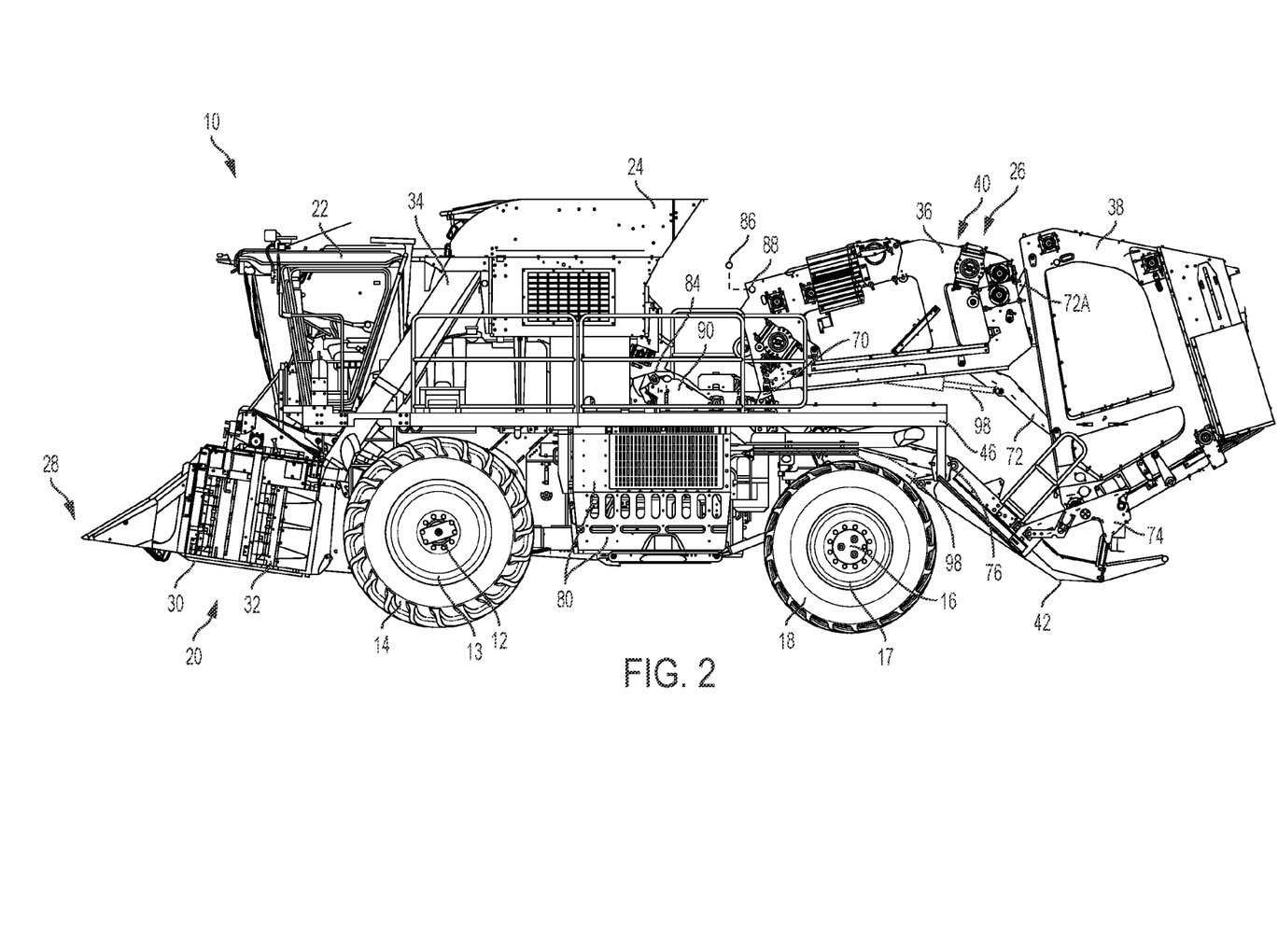
FIG. 2 is a side view of the cotton harvester of FIG. 1 in a transport state.

The harvester 10 is operable to transition between a harvest state (FIG. 1) and a transport state (FIG. 2). In the harvest state, the module builder 26 is operable to receive cotton from the accumulator 24, as described above, and is positioned directly adjacent and abutting the accumulator 24. A module handling system 42 is in an upright arrangement such that a module cannot rest upon the module handling system 42.

In the transport state, as shown in FIG. 2, the processing system 40 of the module builder 26 splits into a first portion 36 and a second portion 38 connected to the first portion 36. The first portion 36 rotates away from the accumulator 24 about a pivot point 70 fixed to the frame 46 of the harvester 10. The pivot point 70 is fixed to a lower portion (i.e., relative to the ground) of the first portion 36. The second portion 38 is connected to the first portion 36 via four bar linkages 72, 72A, allowing the second portion 38 to rotate and translate relative to the first portion 36. The second portion 38 of the processing system 40 is further connected to the module handling system 42 via an arm 74, allowing the second portion 38 to rotate and translate relative to the module handling system 42. The module handling system 42 is connected to the frame 46 at a pivot point 76 such that the module handling system 42 is operable to rotate relative to the frame 46 about the pivot point 76. The pivot point 76 is fixed to a lower portion (i.e., relative to the ground) of the module handling system 42.

As stated above, in order to transition between the harvest state and the transport state, the module builder 26 is rotated relative to the frame 46. In order to rotate the module builder 26, the harvester 10 may be provided with one or more hydraulic cylinders 98. The hydraulic cylinder 98 may be affixed to the frame 46 or an alternative component (e.g., an arm that connects the two halves of the module builder 26) below or adjacent the module builder 26. Alternatively, the module builder 26 may be manually rotated about the pivot point 70.

Figure 3:
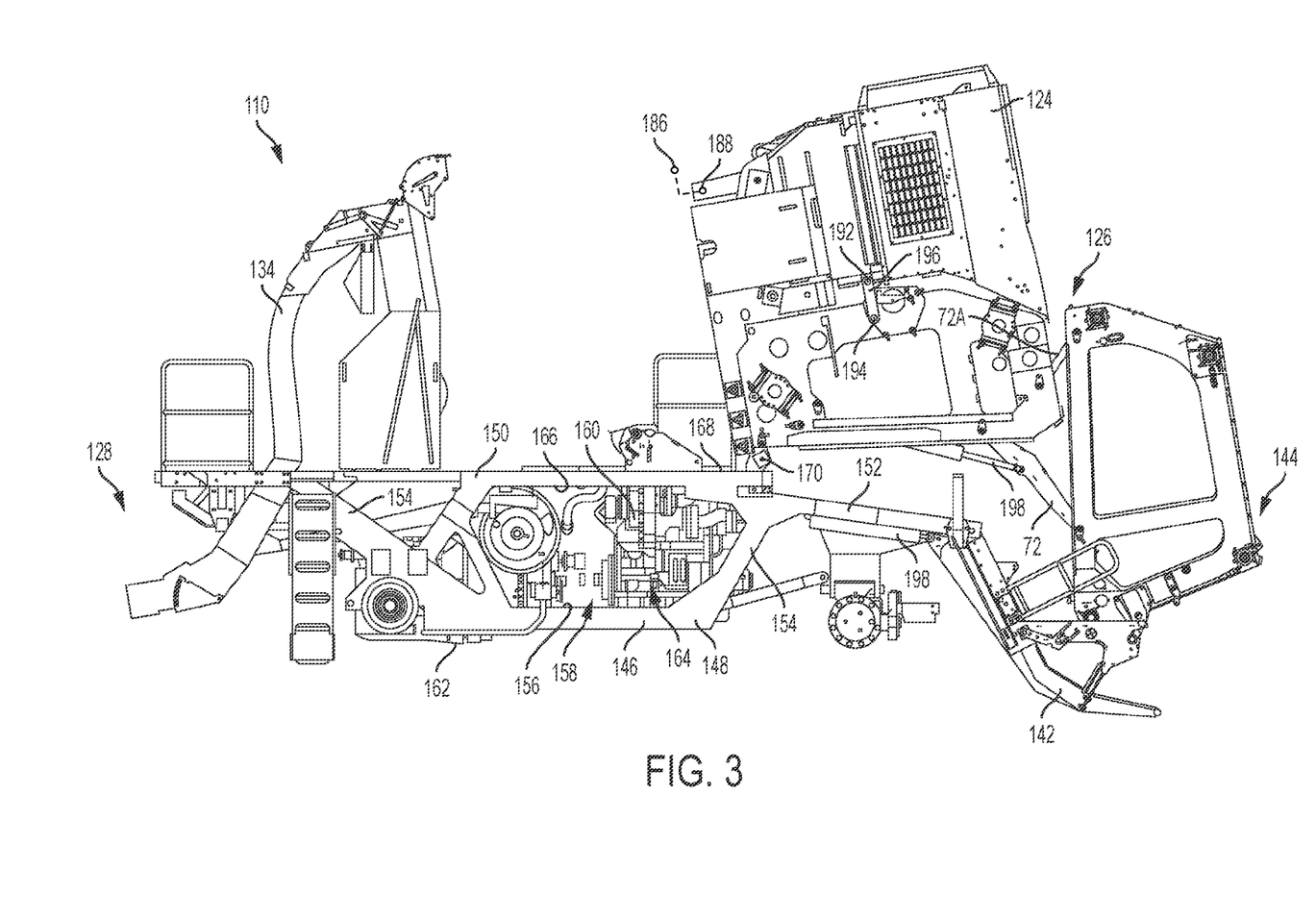
FIG. 3 is a partially deconstructed side view of a cotton harvester including an accumulator attached to a module builder.
Figure 4:
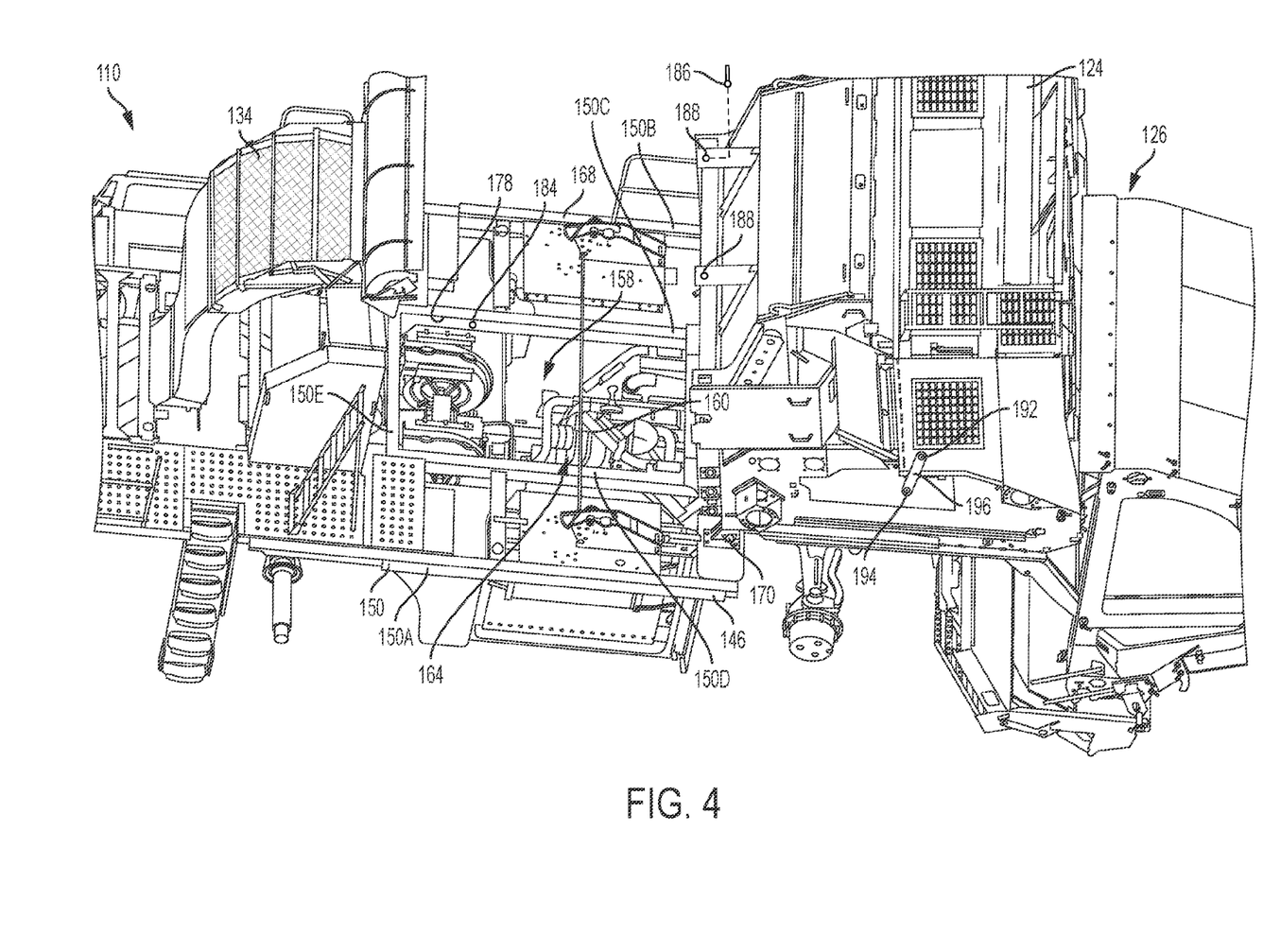
FIG. 4 is a partially deconstructed perspective view of the cotton harvester of FIG. 3.

As shown, the cotton harvester 110 of FIGS. 3-4 includes design variations relative to the harvester 10 of FIGS. 1-2; therefore, similar components are labeled with similar reference numerals, incremented by one hundred. A frame 146 (FIG. 3) includes a lower frame member 148, an upper frame member 150, a rear frame member 152, and a plurality of connection members 154 connecting the lower frame member 148 to the upper frame member 150. It is to be understood that each of the frame members 148, 150, 152, 154 may include multiple individual members fixed to one another to form the frame member 148, 150, 152, 154. For instance, the upper frame member 150 comprises a first frame member component 150A, a second frame member component 150B, a third frame member component 150C, a fourth frame member component 150D, and a fifth frame member component 150E, as shown in FIG. 4. Alternatively, or additionally, the frame members 148, 150, 152, 154 may be formed integrally with one another in any combination.

The lower frame member 148 extends parallel to the surface upon which the tires 14, 18 ride (e.g., field, road, ground, etc.) and defines a lower surface 156 of an engine bay 158. The engine bay 158 houses and provides mounting points for the engine 160 and the transmission 162, collectively referred to as the powertrain 164.

The upper frame member 150 extends along the length of the harvester 110 from an operator cabin (not shown) to the module builder 126, parallel to and above the lower frame member 148. A lower surface of the upper frame member 150 defines an upper surface 166 of the engine bay 158 and is therefore located above the engine 160 and the transmission 162. A top surface 168 of the upper frame member 150 provides a support surface for the accumulator 124 and the module builder 126 when the cotton harvester 110 is in the harvest position (FIG. 1).

As shown in FIG. 4, the upper frame member 150 (and specifically the third, fourth, and fifth components 150C, 150D, 150E) defines a hatch 178 through which the engine bay 158 is accessible. The hatch 178 forms a rectangular aperture centered on and providing access through the upper frame member 150. The hatch 178 is covered by the accumulator 124 and the module builder 126 when the harvester 110 is in the harvest state and is at least partially covered by the accumulator when the harvester 110 is in the transport state.

Referring again to FIG. 3, the rear frame member 152 is attached to and extends outward from the upper frame member 150 towards a rear end 144 of the harvester 110 (opposite the front end 128). The rear frame member 152 provides a mounting surface for supporting the rear drivetrain (e.g., rear axle 16, etc.). Additionally, the rear frame member 152 supports a pin or rod that operates as the pivot point 76 for fixing the module handling system 142 to the frame 146.

The connection members 154 extend transverse to the lower and upper frame members 148, 150 and link the lower frame 148 to the upper frame 150. The height of the engine bay 158 is set by the connection members 154 and is defined as the internal height between the upper surface of the lower frame member 148 and the lower surface of the upper frame member 150. In combination with the connection members 154, body panels 80 (removed for clarity in FIGS. 3-4; otherwise shown in FIGS. 1-2) form sidewalls of the engine bay 158.

The accumulator 124 is attached to the upper frame member 150 at an attachment point 184 via a removable fastener 186 (e.g., a pin, a bolt, etc.) to lock the accumulator 124 to the frame 146. The attachment point 184, as shown, is provided on a panel 190 mounted to the upper frame member 150 and aligns with a mating attachment point 188 on the accumulator such that the fastener 186 extends through both attachment points 184, 188 to lock the accumulator 124 to the frame 146. With the accumulator 124 locked to the frame 146, the accumulator 124 is additionally locked relative to the chute 134, thereby ensuring that the chute 134 is aligned with the accumulator 124. In the harvest state (the harvest state shown in FIG. 1), the fastener 186 further ensures that the accumulator 124 is aligned with the module builder 126, which is mounted to the frame 146 via the pivot point 170. The frame 146 and accumulator 124, as shown, may be provided with multiple attachment points 184, 188, located on the left and right sides of the harvester 110.

The accumulator 124 includes a second attachment point 192 that aligns with an attachment point 194 on the module builder 126. The attachment points 192, 194 are orifices sized to accept the removable fastener 186, similar to the attachment points 184, 188. The attachment points 184, 188, 192, 194 may include threads to accept a threaded fastener 186 such as a bolt, or may be without threads to accept an unthreaded fastener such as a pin.

The fastener 186 may be a single removable fastener, or may alternatively include a bracket 196 with multiple removable fasteners, such that the attachment points 184, 188 and 192, 194 are not aligned to successively accept a single removable fastener, but instead each attachment point receives a separate removable fastener, thereby connecting the attachment points 184, 188 and 192, 194 to one another via the bracket.

In addition to the harvest state (FIG. 1) and the transport state (FIG. 2), the harvester 110 is operable in a maintenance state (FIGS. 3-4) in which the accumulator 124 and the module builder 126 are rotated to provide access to the hatch 178 and the engine bay 158. When the hatch 178 is accessible, a technician is able to access and remove the engine 160 or transmission 162, or provide routine maintenance (e.g., adjusting valve gaps on the engine 160). In order to transition the harvester 110 from the harvest state to the maintenance state, the operator removes the fastener 186 from the attachment points 184, 188 thereby disconnecting the accumulator 124 from the frame 146. The fastener 186 is then mated with the attachment points 192, 194 to attach the accumulator 124 to the module builder 126. Although an alternative fastener may be used, utilizing the same fastener 186 to mate the accumulator 124 to both the module builder 126 and the frame 146 acts as a safeguard to prevent an operator from simultaneously mating the accumulator 124 to the module builder 126 and the frame 146, which would prevent movement of the module builder 126 into the transport state and the maintenance state.

Alternatively, in place of the fastener 186, one or more latch mechanisms may be actuated (e.g., hydraulically, electrically) to connect the accumulator 124 to the module builder 126 or the frame 146. Such latching mechanisms would assist in automating the process of switching between the harvest state and the maintenance state.

Once connected to the module builder 126, the accumulator 124 is rotated about the pivot point 170 as a single body with the module builder 126. The rotating body comprising the accumulator 124 and module builder 126 may be actuated into rotation via the hydraulic cylinders 198 otherwise used to transition the harvester 110 from the harvest state to the transport state. Alternatively, the rotating body may be manually rotated into the maintenance state. When in the maintenance state, the operator is able to access the hatch 178 leading to the engine bay 158, engine 160, and transmission 162. In some embodiments, the hydraulic motor used to drive the infeed belt may need to be removed prior to rotating the accumulator 124. In other embodiments (FIGS. 6-7), the module builder 126 and accumulator 124 are attached to a separate sub-frame, such that the hydraulic motor would not need to be removed.

Figure 5:
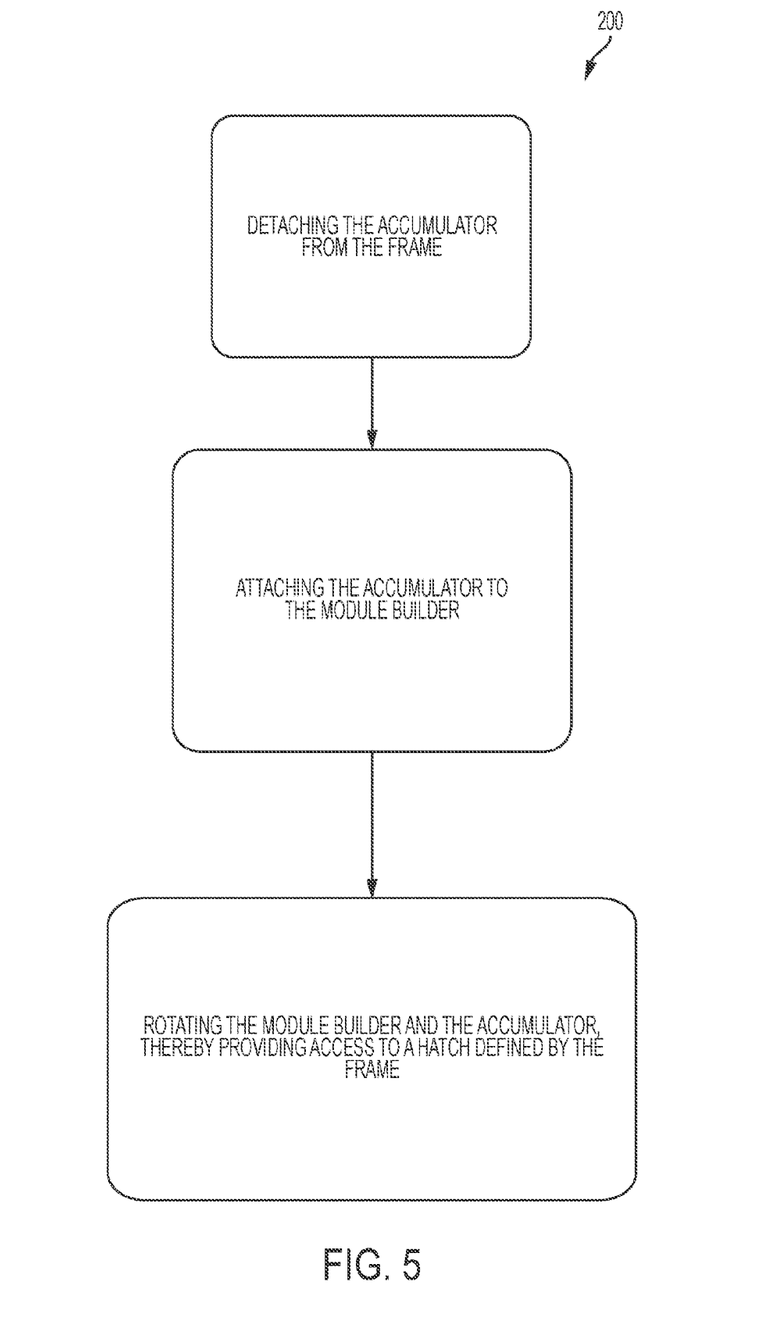
FIG. 5 is a flow diagram outlining a method of accessing an engine or a transmission of an agricultural vehicle.

As shown in the flow diagram 200 of FIG. 5, a method of accessing an engine 160 or a transmission 162 of an agricultural vehicle 110 includes providing the agricultural vehicle 110 in a first state in which a module builder 126 receives a product from an accumulator 124. The accumulator 124 is attached to a frame 146 of the agricultural vehicle 110 and at least partially covers a hatch 178 defined by the frame 146. The hatch 178 provides access to the engine 160 or the transmission 162 of the vehicle 110. The accumulator 124 is detached from the frame 146. The accumulator 124 is attached to the module builder 126. The module builder 126 and the accumulator 124 are rotated, thereby providing access to the hatch 178.

Transitioning from the maintenance state to the harvest state involves reversing the process of transitioning from the harvest state to the maintenance state. The rotating body is rotated such that the accumulator 124 and the module builder 126 contact the frame 146 (similar to the position shown in FIG. 1). The fastener 186 is detached from the attachment points 192, 194 to detach the accumulator 124 from the module builder 126. The fastener 186 is then mated with the attachment points 184, 188 to attach the accumulator 124 to the frame 146.

Figure 6:
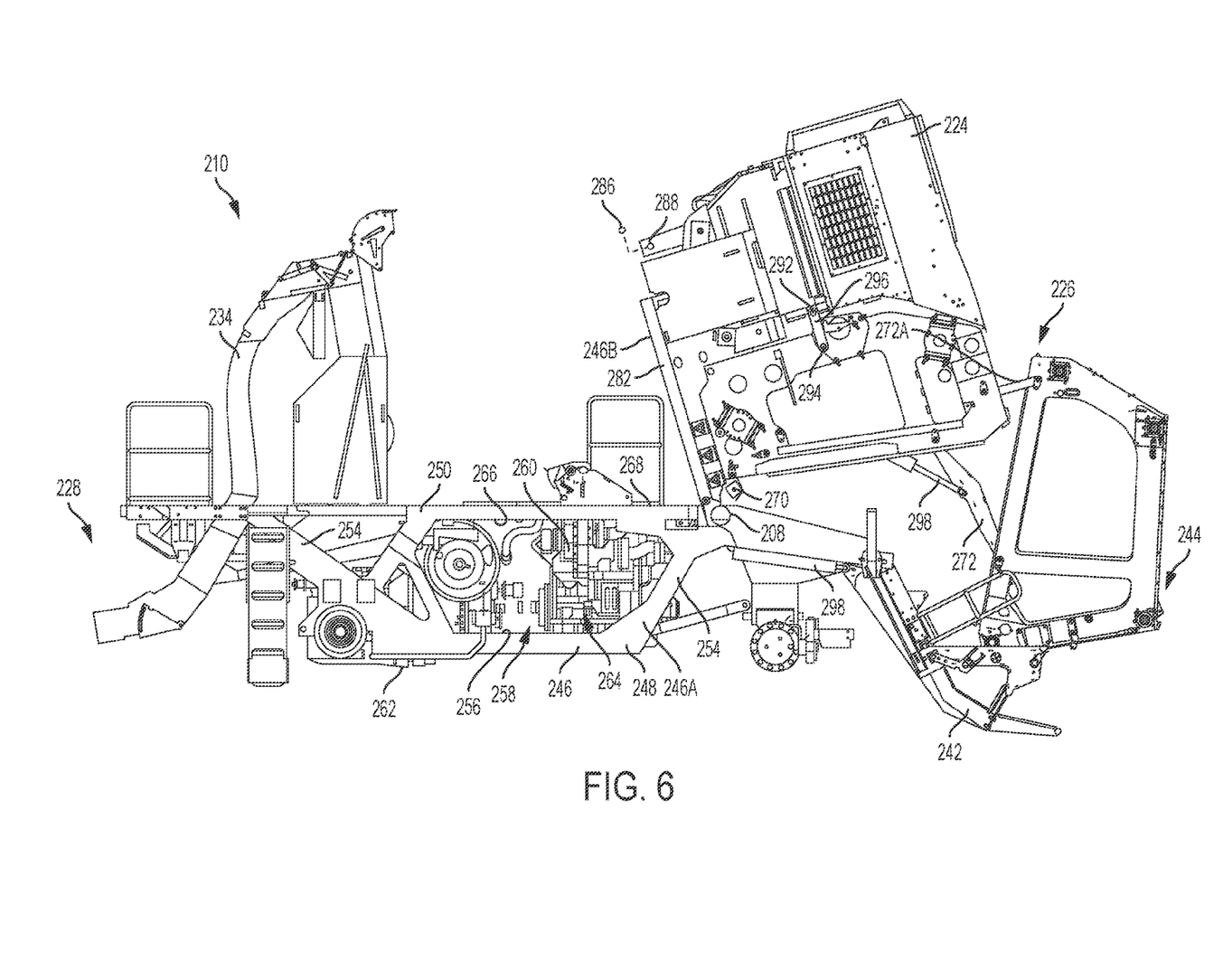
FIG. 6 is a partially deconstructed side view of a cotton harvester including an accumulator attached to a module builder.
Figure 7:
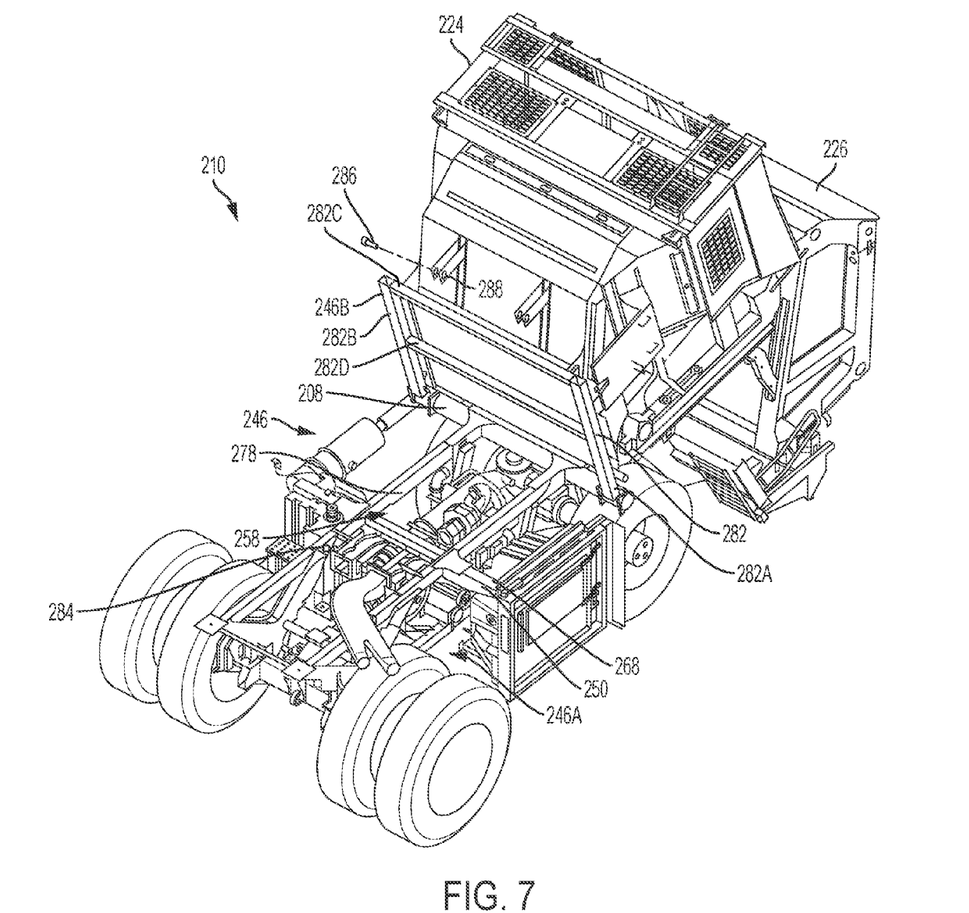
FIG. 7 is a partially deconstructed perspective view of the cotton harvester of FIG. 6

As shown, the cotton harvester 210 of FIGS. 6-7 includes design variations relative to the harvesters 10 and 110 of FIGS. 1-2 and 3-4, respectively; therefore, similar components are labeled with similar reference numerals, incremented by one hundred (i.e., harvester 210). A frame 246 includes a first sub-frame assembly 246A and a second sub-frame assembly 246B. The first sub-frame assembly 246A includes a lower frame member 248, an upper frame member 250, a rear frame member 252, and a plurality of connection members 254 connecting the lower frame member 248 to the upper frame member 250. The second sub-frame assembly 246B includes an additional frame member 282 and is rotatable relative to the first sub-frame assembly 246A. It is to be understood that each of the frame members 248, 250, 252, 254, 282 may include multiple individual members fixed to one another to form the frame member 248, 250, 252, 254, 282. For instance, the additional frame member 282 comprises a first frame member component 282A, a second frame member component 282B, a third frame member component 282C, and a fourth frame member component 282D, as shown in FIG. 7. The third and fourth frame members 282C, 282D extend transverse to and connect the first and second frame members 282A, 282B to one another.

The first sub-frame assembly 246A functions similar to the frame 146 (FIGS. 3-4). The upper frame member 250 extends from an operator cabin (not shown) to the rear frame member 252, with a transverse member or pivot support beam 208 (e.g., cylindrical tube, square tube or beam, etc.) fixed to the first sub-frame assembly 246A and located between the upper and rear frame members 250, 252. The top surface 268 of the upper frame member 250 provides a support surface for the second sub-frame assembly 246B, which in turn provides a support surface for the accumulator 224 and the module builder 226 when the cotton harvester 210 is in the harvest position (shown with respect to harvester 10 in FIG. 1). The second sub-frame assembly 246B is fixed to a lower portion of the accumulator 224 at a distal end and is hinged about and further fixed to the picot support beam 208.

As shown in FIG. 7, the upper frame member 250 defines a hatch 278 through which the engine bay 258 is accessible. The hatch 278 forms a rectangular aperture centered on and providing access through the upper frame member 250. The hatch 278 is covered by the accumulator 224 and the module builder 226 when the harvester 210 is in the harvest state and is at least partially covered by the accumulator when the harvester 210 is in the transport state.

The accumulator 224 and second sub-frame assembly 246B are attached to the upper frame member 250 at an attachment point 284 via a removable fastener 286 (e.g., a pin, a bolt, etc.) to lock the accumulator 224 and second sub-frame assembly 246B to the first sub-frame assembly 246A. The attachment point 284, as shown, is provided on the upper frame member 250 and aligns with a mating attachment point 288 on the accumulator such that the fastener 286 extends through both attachment points 284, 288 to lock the accumulator 224 and the second sub-frame assembly 246B to the first sub-frame assembly 246A. With the second sub-frame assembly 246B locked to the first sub-frame assembly 246A (to limit relative movement therebetween), the accumulator 224 is additionally locked relative to the chute 234, thereby ensuring that the chute 234 is aligned with the accumulator 224. In the harvest state (the harvest state shown in FIG. 1), the fastener 286 further ensures that the accumulator 224 is aligned with the module builder 226, which is mounted to the second sub-frame assembly 246B between the accumulator 224 and the pivot point 270. The pivot point 270 is fixed to or integral with the pivot support beam 208. The first sub-frame assembly 246A and accumulator 224, as shown, may be provided with multiple attachment points 284, 288, located on the left and right sides of the harvester 210.

The accumulator 224 includes a second attachment point 292 that aligns with an attachment point 294 on the module builder 226. The attachment points 292, 294 are orifices sized to accept the removable fastener 286, similar to the attachment points 284, 288. The attachment points 284, 288, 292, 294 may include threads to accept a threaded fastener 286 such as a bolt, or may be without threads to accept an unthreaded fastener such as a pin.

The fastener 286 may be a single removable fastener or may alternatively include a bracket 296 with multiple removable fasteners, such that the attachment points 284, 288 and 292, 294 are not aligned to successively accept a single removable fastener, but instead each attachment point receives a separate removable fastener, thereby connecting the attachment points 284, 288 and 292, 294 to one another via the bracket.

In addition to the harvest state (FIG. 1) and the transport state (FIG. 2), the harvester 210 is operable in a maintenance state (FIGS. 6-7) in which the accumulator 224 and the module builder 226 are rotated to provide access to the hatch 278 and the engine bay 258. When the hatch 278 is accessible, a technician is able to access and remove the engine 260 or transmission 262, or provide routine maintenance (e.g., adjusting valve gaps on the engine 260). In order to transition the harvester 210 from the harvest state to the maintenance state, the operator removes the fastener 286 from the attachment points 284, 288 thereby disconnecting the accumulator 224 from the first sub-frame assembly 246A. The fastener 286 is then mated with the attachment points 292, 294 to attach the accumulator 224 to the module builder 226. Although an alternative fastener may be used, utilizing the same fastener 286 to mate the accumulator 224 to both the module builder 226 and the first sub-frame assembly 246A acts as a safeguard to prevent an operator from simultaneously mating the accumulator 224 to the module builder 226 and the first sub-frame assembly 246A, which would prevent movement of the module builder 226 into the transport state and the maintenance state.

Alternatively, in place of the fastener 286, one or more latch mechanisms may be actuated (e.g., hydraulically, electrically) to connect the accumulator 224 to the module builder 226 or the first sub-frame assembly 246A. Such latching mechanisms would assist in automating the process of switching between the harvest state and the maintenance state.

Once connected to the module builder 226, the accumulator 224 is rotated about the pivot point 270 as a single body with the module builder 226. The rotating body comprising the accumulator 224, module builder 226, and the second sub-frame assembly 246B may be actuated into rotation via the hydraulic cylinders 298 otherwise used to transition the harvester 210 from the harvest state to the transport state. Alternatively, the rotating body may be manually rotated into the maintenance state. When in the maintenance state, the operator is able to access the hatch 278 leading to the engine bay 258, engine 260, and transmission 262.

The motor utilized to drive the infeed belt (not shown) is mounted to the second sub-frame assembly 246B. When the second sub-frame assembly 246B is rotated with the accumulator 224 and module builder 226, the motor is additionally rotated. Therefore, the motor does not need to be disconnected from the harvester 210 prior to rotating the rotating body to the maintenance state. In comparison, the harvester 110 of FIGS. 3-4 does not include a second sub-frame assembly, and the motor is mounted directly to the frame 146.

Transitioning from the maintenance state to the harvest state involves reversing the process of transitioning from the harvest state to the maintenance state. The rotating body is rotated such that the second sub-frame assembly 246B contacts the first sub-frame assembly 246A (i.e., the additional frame member 282 is parallel to the upper frame member 250). The fastener 286 is detached from the attachment points 292, 294 to detach the accumulator 224 from the module builder 226. The fastener 286 is then mated with the attachment points 284, 288 to attach the accumulator 224 to the first sub-frame assembly 246A.

Various features of the disclosure are set forth in the following claims.

What is claimed is:

1. An agricultural vehicle for picking or harvesting a product, the agricultural vehicle comprising:
   a motor;
   a plurality of tires;
   a transmission mating the motor to the plurality of tires;
   an accumulator operable to store the product;
   a module builder operable to receive the product from the accumulator, and
   a frame supporting the accumulator and the module builder, the frame defining a hatch through which an operator is capable of accessing the motor and/or the transmission,
   wherein the agricultural vehicle is operable to transition between a first state and a second state,
   wherein, in the first state, the module builder and the accumulator prohibit access through the hatch, and
   wherein, in the second state, the module builder and the accumulator are rotated relative to the frame and provide access through the hatch.

2. The agricultural vehicle of claim 1, wherein the agricultural vehicle is further operable to transition between the first state and a third state in which the module builder is rotated relative to the accumulator and the frame.

3. The agricultural vehicle of claim 2, wherein, in the third state, the accumulator hinders access through the hatch.

4. The agricultural vehicle of claim 2, wherein, in the third state, the module builder is rotated about a pivot point, and wherein, in the first state, the module builder and the accumulator are rotated about the pivot point.

5. The agricultural vehicle of claim 1, wherein, in the first state, the accumulator is attached to the frame, and wherein, in the second state, the accumulator is attached to the module builder.

6. The agricultural vehicle of claim 5, further comprising a removable fastener, the removable fastener operable to attach the accumulator to the frame in the first state and attach the accumulator to the module builder in the second state.

7. The agricultural vehicle of claim 5, wherein the accumulator is fixed relative to the frame in the first state.

8. The agricultural vehicle of claim 5, wherein the accumulator is detached from the module builder in the first state.

9. The agricultural vehicle of claim 1, further comprising a hydraulic cylinder operable to rotate the module builder and accumulator when the agricultural vehicle transitions from the first state to the second state.

10. The agricultural vehicle of claim 1, wherein the frame is a first frame, and further comprising a second frame configured to rotate concurrently with the accumulator.

11. The agricultural vehicle of claim 10, wherein in the first state the first frame supports the second frame.

12. A method of accessing a powertrain of an agricultural vehicle in a state in which a module builder receives a product from an accumulator, the accumulator is attached to a frame of the agricultural vehicle and at least partially covers a hatch defined by the frame, and the hatch provides access to the powertrain of the vehicle, the method comprising:

detaching the accumulator from the frame;
attaching the accumulator to the module builder; and
rotating the module builder and the accumulator, thereby providing access to the hatch.

13. The method of claim 12, wherein the hatch is inaccessible when the agricultural vehicle is in the first state.

14. The method of claim 12, wherein detaching the accumulator from the frame includes removing a fastener and wherein attaching the accumulator to the module builder includes installing a fastener.

15. The method of claim 12, wherein the module builder rotates about a pivot point on the frame.

16. The method of claim 12, further comprising actuating a hydraulic cylinder to rotate the module builder and the accumulator.

17. An agricultural vehicle for picking or harvesting a product, the agricultural vehicle comprising:
a frame supporting a motor and including a first attachment point;
an accumulator; and
a module builder attached to the frame and operable to rotate about a pivot point, the module builder including a second attachment point,
wherein the accumulator is operable to transition between a first state and a second state,
wherein, in the first state, the accumulator is attached to the first attachment point, and
wherein, in the second state, the accumulator is attached to the second attachment point and is operable to rotate about the pivot point.

18. The agricultural vehicle of claim 17, wherein the accumulator is not attached to the second attachment point in the first state, and is not attached to the first attachment point in the second state.

19. The agricultural vehicle of claim 17, wherein the frame defines a hatch through which the engine is accessible, and wherein the hatch is accessible in the second state.

20. The agricultural vehicle of claim 19, wherein the agricultural vehicle is operable to harvest the product in the first state, and wherein the hatch is not accessible in the first state.

21. The agricultural vehicle of claim 17, wherein the accumulator is attached to the frame in the first state via a fastener, and wherein the accumulator is attached to the module builder in the second state via the fastener.

22. The agricultural vehicle of claim 17, wherein the vehicle is a cotton stripper or a cotton picker.

* * * * *